(12) United States Patent
Li et al.

(10) Patent No.: US 12,406,504 B2
(45) Date of Patent: Sep. 2, 2025

(54) EDGE COMPUTING-BASED ADDITIVE MANUFACTURING REAL-TIME MONITORING METHOD AND SYSTEM

(71) Applicant: WUHAN UNIVERSITY, Hubei (CN)

(72) Inventors: Hui Li, Hubei (CN); Shengnan Shen, Hubei (CN); Zhixin Bao, Hubei (CN); Wenkang Zhu, Hubei (CN); Yu Zhang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/929,566

(22) Filed: Oct. 28, 2024

(65) Prior Publication Data

US 2025/0218181 A1    Jul. 3, 2025

(30) Foreign Application Priority Data

Jan. 3, 2024   (CN) .......................... 202410010843.3

(51) Int. Cl.
```
G06V 20/52        (2022.01)
G06T 3/4053       (2024.01)
G06V 10/77        (2022.01)
G06V 10/774       (2022.01)
G06V 10/82        (2022.01)
```
(52) U.S. Cl.
CPC ............ *G06V 20/52* (2022.01); *G06T 3/4053* (2013.01); *G06V 10/7715* (2022.01); *G06V 10/774* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 11,084,225 B2* | 8/2021 | Pinskiy | ................ G06V 10/764 |
| 2018/0120260 A1* | 5/2018 | Goldfine | ........... G01N 27/9046 |
| 2019/0283333 A1* | 9/2019 | Hwang | ................. G06N 3/045 |
| 2022/0134435 A1* | 5/2022 | Scime | ...................... G06T 7/11 |
| | | | 264/112 |
| 2022/0134647 A1* | 5/2022 | Gold | ..................... B22F 12/90 |
| | | | 264/40.1 |

(Continued)

FOREIGN PATENT DOCUMENTS

| | | |
|---|---|---|
| CN | 111062872 | 4/2020 |
| CN | 112632720 | 4/2021 |
| CN | 116237545 | 6/2023 |

OTHER PUBLICATIONS

Zhuang Ma et al., "Terminal Deployment for Edge Computing-driven Chatbot", Software Engineering, with English translation thereof, Feb. 28, 2021, pp. 1-10.

(Continued)

*Primary Examiner* — Leon Flores
(74) *Attorney, Agent, or Firm* — JCIP GLOBAL INC.

(57) ABSTRACT

A real-time edge computing method and system for additive manufacturing monitoring are presented. The method involves creating a dataset, developing an online monitoring model, and training it with the dataset. The trained model is then deployed on an edge device to monitor the additive manufacturing process in real-time. The system comprises an edge device and a high-speed camera for capturing and transmitting manufacturing footage to the edge device, which analyzes the data using the deployed model for continuous process monitoring.

10 Claims, 10 Drawing Sheets

(56) References Cited

U.S. PATENT DOCUMENTS

2022/0172330 A1\* 6/2022 Mason .................. G06T 5/50

OTHER PUBLICATIONS

Christian Gobert et al., "Application of supervised machine learning for defect detection during metallic powder bed fusion additive manufacturing using high resolution imaging.", Additive Manufacturing, Aug. 7, 2018, pp. 1-33.

\* cited by examiner

EDGE COMPUTING-BASED ADDITIVE MANUFACTURING REAL-TIME MONITORING METHOD AND SYSTEM

CROSS-REFERENCE TO RELATED APPLICATIONS

This application claims the priority benefit of China application no. 202410010843.3 filed on Jan. 3, 2024. The entirety of each of the above-mentioned patent applications is hereby incorporated by reference herein and made a part of this specification.

TECHNICAL FIELD

This invention pertains to the field of additive manufacturing and, more specifically, concerns a real-time monitoring method and system for additive manufacturing based on edge computing.

BACKGROUND

Additive manufacturing, as a near net shape forming process that directly prints metal and other raw materials into products, has extremely high application value in fields such as aerospace, automotive and shipbuilding, micro nano manufacturing, and biomedical engineering. However, due to its unique layer-by-layer printing mechanism, the manufacturing process has a high tendency for defects, potentially leading to issues like density differences, anisotropy, local deformations, and stress concentrations. Consequently, a reasonable and efficient inspection method is essential for defect detection and quality inspection.

In recent years, image processing algorithms based on artificial intelligence have rapidly evolved, with numerous applications in real-time monitoring for additive manufacturing, offering new approaches to feature monitoring and quality control. Monitoring additive manufacturing processes demands high-performance from high-speed cameras. However, current models suffer from high costs and low resolution, hampering high-precision image segmentation. Additionally, AI-based image processing algorithms demand substantial computational power, and the industry typically separates data acquisition from processing, utilizing remote servers to execute algorithm models, which incurs high communication latency and unstable data transmission.

SUMMARY

The present invention provides an edge computing-based real-time monitoring method and system for additive manufacturing, leveraging edge computing, which addresses the challenges of high-precision image segmentation, significant communication delays, and inconsistent data transmission in existing additive manufacturing monitoring techniques.

This invention introduces a real-time monitoring method for additive manufacturing, leveraging edge computing, consisting of the following steps:

Establish a dataset for additive manufacturing.

Developing a real-time monitoring model for additive manufacturing, which includes a video super-resolution model and a feature segmentation model. The video super-resolution model receives video sequences as input, while the feature segmentation model receives the output from the video super-resolution model and produces feature segmentation maps.

The video super-resolution model comprises a spatiotemporal encoder, a residual feature extraction module, and modules for query, key, and value matrix generation. The pixel resolution of any frame in the input video sequence is $(h_0/r, w_0/r, 1)$, where $h_0$ and $w_0$ represent the number of pixels in the height and width, respectively, and r is the magnification for super-resolution reconstruction. The video sequence, after being encoded by the spatiotemporal encoder, is fed into the residual feature extraction module to produce a feature map matrix, which is then fed into the respective modules to obtain the query, key, and value matrices. A comprehensive feature map is derived from the query, key, and value matrices. The comprehensive feature map undergoes pixel reordering to produce a super-resolution reconstruction with a pixel resolution of $(h_0, w_0, 1)$.

Train the real-time monitoring model using the dataset and obtain a trained real-time monitoring model.

Deploy the trained real-time monitoring model on the edge computing equipment, and use the edge computing equipment to obtain real-time monitoring information of additive manufacturing.

Preferably, the residual feature extraction module comprises n cascaded residual blocks. Each residual block includes a first 3D convolutional layer with a kernel size of 1×1, a first batch normalization layers, a second 3D convolutional layer with a kernel size of 3×3, and a second batch normalization layers. The number of convolution kernels in the first 3D convolutional layer is 32*index. The number of convolution kernels in the second 3D convolutional layer is 32.

Preferably, the structures of the query matrix generation module, the key matrix generation module, and the value matrix generation module are the same, all including k cascaded blocks. The structure of the first k−1 block includes a third 3D convolutional layer with a kernel size of 1×1 and a third batch normalization layer. The number of convolution kernels in the third 3D convolutional layer is 32n, where n is the number of residual blocks included in the residual feature extraction module. The structure of the last block includes a fourth 3D convolutional layer with a kernel size of 3×3 and a fourth batch normalization layer, where the number of convolution kernels in the fourth 3D convolutional layer is 1.

Preferably, the weights of the query matrix generation module, the key matrix generation module, and the value matrix generation module after training are different. By using the query matrix generation module, the key matrix generation module, and the value matrix generation module, matrices with the same shape but different values can be obtained.

Preferred, the input video sequence is denoted as $\{X_{t-N}, \ldots, X_t, \ldots, X_{t+N}\}$. The query matrix is denoted as $Q_t$. The key matrix is denoted as $\{K_i\}$, $t-N \leq i \leq t+N, i \neq t$. The value matrix is denoted as $\{V_i\}$, $t-N \leq i \leq t+N$. the value matrix of the current frame is denoted as $V_t$. The overall feature map is calculated using the following method.

$$FM_t = V_t + \sum_{i=t-N, i \neq t}^{t+N} \text{Softmax}(Q_t, K_i) V_i$$

In the formula, $FM_t$ is the overall feature map.

Preferably, the feature segmentation model comprises an encoder and a decoder. The encoder uses Xception network as the backbone to extract features, and outputs the feature extraction results output by the video super-resolution model and the feature extraction results after spatial pyramid pooling to the decoder, respectively. The decoder employs 1×1 convolution and 4-fold upsampling to integrate the results from the two feature extractions and deliver a high-resolution feature segmentation map.

The preferred dataset includes a video super-resolution dataset and a feature segmentation dataset.

Using a high-speed camera to capture the process of additive manufacturing and obtain the original image sequence in the RGB color space, through Obtain the reference brightness matrix sequence through RGB-YCbCr color space conversion. Using nearest neighbor interpolation to reduce the resolution of the reference brightness matrix sequence to 1/r of its original value, resulting in a low resolution brightness matrix sequence.

Train the video super-resolution model using the video super-resolution dataset, with the low resolution brightness matrix sequence as input and the reference brightness matrix sequence as output.

Train the feature segmentation model with the feature segmentation dataset, using the reference brightness matrix as input and producing feature segmentation maps annotated with different feature contours from the additive manufacturing process.

Preferably, when training the real-time monitoring model, the mean square error is used as the loss function, and the Adam optimizer is selected to optimize the network weights.

Preferably, the trained real-time monitoring model is quantized and pruned by the edge computing hardware SDK to obtain a model adapted to the hardware of the edge computing device. Create a model session in the edge computing device and place it on the back end as a service, fix the relative position between the high-speed camera and the metal powder bed, connect the video sequence captured by the high-speed camera to the back end interface, and use the edge computing device to obtain real-time monitoring information of additive manufacturing.

On the other hand, the invention provides a real-time monitoring system for additive manufacturing based on edge computing, including: edge computing equipment and high-speed camera. The high-speed camera is used for photographing the process of additive manufacturing, and transmitting the captured video sequence to the edge computing device. The edge computing device is deployed with a trained real-time monitoring model, and the edge computing device is used to obtain real-time monitoring information of additive manufacturing.

The edge computing based real-time monitoring system for additive manufacturing is used to execute the steps in the edge computing based real-time monitoring method for additive manufacturing.

One or more technical solutions provided in the present invention have at least the following technical effects or advantages.

The real-time monitoring model for additive manufacturing developed by this invention encompasses a video super-resolution model and a feature segmentation model. The video super-resolution model includes a spatiotemporal encoder, a residual feature extraction module, a query matrix generation module (Gen_Q), a key matrix generation module (Gen_K), and a value matrix generation module (Gen_V). The pixel resolution of any frame image in the input video sequence is $(h_0/r, w_0/r, 1)$, where $h_0$ and $w_0$ represent the number of pixels in the height and width of the image, respectively, and r represents the magnification of the super-resolution reconstruction. The video sequence, after being encoded by the spatiotemporal encoder, is fed into the residual feature extraction module to produce a feature map matrix, which is then fed into each of the query matrix generation module, key matrix generation module, and value matrix generation module to obtain the query, key, and value matrices, respectively. A comprehensive feature map is derived from the query, key, and value matrices. The comprehensive feature map undergoes pixel rearrangement to produce a super-resolution reconstruction with a pixel resolution of $(h_0, w_0, 1)$. This invention employs a dataset specific to additive manufacturing to train the real-time monitoring model, resulting in a well-trained model. The fine-tuned real-time monitoring model is deployed on edge computing devices, which are then utilized to gather real-time monitoring data for additive manufacturing. Compared to the typical approach in visual transformers that flattens features into a single dimension and computes feature vectors like Q, K, and V to enable local attention, the proposed approach does not flatten the feature matrix. Instead, it maintains the original two-dimensional shape to generate Q, K, and V feature matrices, endowing the network with spatial global attention. This approach not only reduces computational demands but also retains spatiotemporal information, enhancing both computational speed and overall efficiency. The video super-resolution model based on the visual Transformer proposed herein surpasses mainstream networks in image quality reconstruction at equivalent inference speeds, leading in peak signal-to-noise ratio (PSNR) and outperforming classical interpolation algorithms and most super-resolution neural network models. Thanks to the super-resolution reconstruction results' richer explicit image features, the accuracy of feature extraction is notably enhanced compared to direct extraction. Additionally, as the trained real-time monitoring model is deployed on edge computing devices, it offers rapid inference speeds, significantly reducing time compared to CPU-based reasoning, thus facilitating timely feedback in the manufacturing process. By applying the video super-resolution model, only $1/r^2$ of the original data needs to be transmitted (for instance, instead of sending the entire 300 pixels×300 pixels image, only 75 pixels*75 pixels are needed to reconstruct an image of nearly the same high quality), and super-resolution reconstruction is performed on the receiving end, yielding high-quality, highly accurate data. This significantly reduces communication bandwidth and speed requirements while also providing lower latency and greater stability under the same communication conditions. In conclusion, the present invention enables stable, low-latency, high-resolution, and high-precision real-time monitoring of features in additive manufacturing processes, while also reducing the demands on high-speed camera equipment.

DETAILED DESCRIPTION

Figure 1:
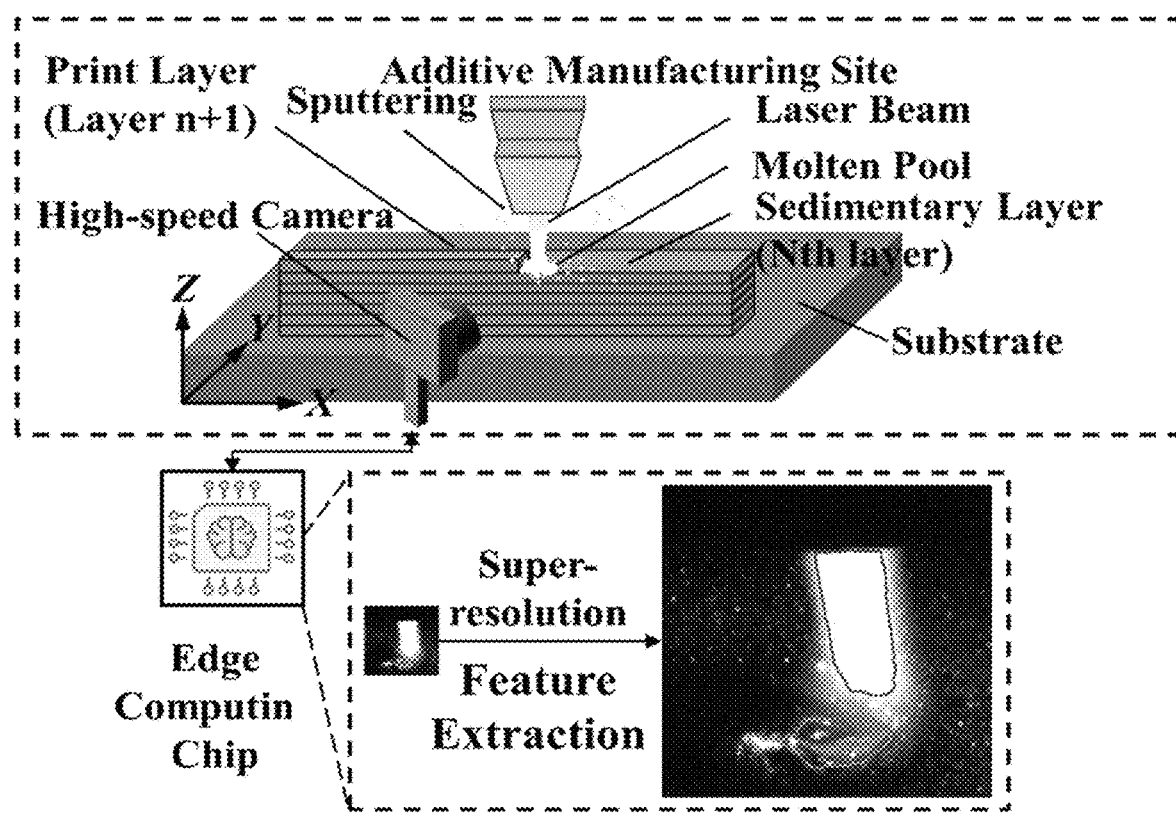
FIG. 1 illustrates a schematic diagram of an edge computing-based real-time monitoring system for additive manufacturing provided by an embodiment of the present invention.

To make the foregoing technical solutions better understood, the foregoing technical solutions are described below in detail with reference to the accompanying drawings of the specification and specific implementations.

Embodiment 1

Embodiment 1 provides an edge computing-based real-time monitoring method for additive manufacturing. The method is implemented by one or more edge computing device comprising a processor, a memory, and a communication interface. The memory stores computer-executable instructions which, when executed by the processor, cause the processor to perform the following steps:

Step 1: Establish a dataset for additive manufacturing.

Step 2: Build a real-time monitoring model for additive manufacturing, which includes a video super-resolution model and a feature segmentation model. The video super-resolution model takes video sequences as input, the feature segmentation model takes the output of the video super-resolution model as input, and the feature segmentation model outputs feature segmentation maps.

The video super-resolution model includes a spatiotemporal encoder, a residual feature extraction module, a query matrix generation module, a key matrix generation module, and a value matrix generation module.

The pixel resolution of any frame image in the input video sequence is $(h_0/r, w_0/r, 1)$, where $h_0$ and $w_0$ represent the number of pixels in the image's height and width, respectively, and r represents the magnification factor for super-resolution reconstruction. The video sequence, after being encoded by the spatiotemporal encoder, is input into the residual feature extraction module to obtain a feature map matrix. This matrix is subsequently input into the query, key, and value matrix generation modules, resulting in the respective query, key, and value matrices. Using the query, key, and value matrices, a comprehensive feature map is derived. This feature map undergoes pixel rearrangement, producing a super-resolution reconstruction with a pixel resolution of $(h_0, w_0, 1)$.

Specifically, the residual feature extraction module comprises n cascaded residual blocks. Each residual block comprises a first 3D convolutional layer (Conv3d) with a 1×1 kernel, a first batch normalization layers (BN), a second 3D convolutional layer with a 3×3 kernel, and a second batch normalization layers. The first 3D convolutional layer has a convolutional kernel count of 32*index. The second 3D convolutional layer has a convolutional kernel count of 32.

The query, key, and value matrix generation modules share the same structure, each comprising k concatenated blocks. The first k−1 blocks each feature a third 3D convolutional layer with a 1×1 kernel size and a third batch normalization layer. The third 3D convolutional layer has 32n convolution kernels, where n represents the number of residual blocks in the residual feature extraction module. The final block includes a fourth 3D convolutional layer with a 3×3 kernel size and a fourth batch normalization layer, and it has just one convolution kernel.

After training, the weights of the query matrix generation module, the key matrix generation module, and the value matrix generation module differ. Using these modules, matrices with the same shape but different values can be obtained.

Specifically, the input video sequence is denoted as $\{X_{t-N}, \ldots, X_t, \ldots, X_{t+N}\}$, the query matrix is denoted as $Q_t$. The key matrix is denoted as $\{K_i\}$, $t-N \leq i \leq t+N$, $i \neq t$. The value matrix is denoted as $\{V_i\}$, $t-N \leq i \leq t+N$. the value matrix of the current frame is denoted as $V_t$. The overall feature map is calculated using the following method.

$$FM_t = V_t + \sum_{i=t-N, i \neq t}^{t+N} \text{Softmax}(Q_t, K_i) V_i$$

In the formula, $FM_t$ is the overall feature map.

Specifically, the feature segmentation model includes an encoder and a decoder. The encoder uses an Xception network as a backbone to extract features, and the encoder outputs the feature extraction results output by the video super-resolution model and the feature extraction results after spatial pyramid pooling to the decoder separately. The decoder uses 1×1 convolution and 4-fold upsampling to fuse the two feature extraction results and output a high-resolution feature segmentation map.

Step 3: Train the real-time monitoring model using the provided dataset to obtain a trained real-time monitoring model.

Step 4: Deploy the trained real-time monitoring model on an edge computing device, and use the edge computing device to obtain real-time monitoring information for additive manufacturing.

Wherein the dataset comprises a video super-resolution dataset and a feature segmentation dataset. The process of additive manufacturing is photographed using a high-speed camera to obtain the original image sequence in the RGB color space. Obtaining a reference brightness matrix sequence through RGB-YCbCr color space conversion. By employing the nearest neighbor interpolation method, the resolution of the reference brightness matrix sequence is reduced to 1/r of its original value, resulting in a low-resolution brightness matrix sequence. Training the video super-resolution model using the video super-resolution dataset, with the low-resolution luminance matrix sequence as input and the reference luminance matrix sequence as output. Training the feature segmentation model using the feature segmentation dataset, with the reference brightness matrix as the input and the feature segmentation map marked with different feature contours in the additive manufacturing process as the output.

When training the real-time monitoring model, the mean square error can be used as the loss function, and the Adam optimizer can be selected for network weight tuning.

In addition, the trained real-time monitoring model can be quantized and pruned by the edge computing hardware SDK to obtain a model that is compatible with the hardware of the edge computing device. Creating a model session in the edge computing device, placing it as a service on the backend, fixing the relative positions of the high-speed camera and the metal powder bed, accessing the video sequence captured by the high-speed camera to the backend interface, and using the edge computing device to obtain real-time monitoring information for additive manufacturing.

Embodiment 2

Embodiment 2 provides an additive manufacturing real-time monitoring system based on edge computing, comprising an edge computing device and a high-speed camera. The high-speed camera is used to capture the process of additive manufacturing and transmit the captured video sequence to the edge computing device. The edge computing device is deployed with a trained real-time monitoring model, and is used to obtain real-time monitoring information for additive manufacturing.

The real-time monitoring system for additive manufacturing based on edge computing provided in Embodiment 2 is used to perform the steps in the real-time monitoring method for additive manufacturing based on edge computing as described in Embodiment 1. The functions of each component in Embodiment 2 correspond to the steps in the method provided in Embodiment 1, so it can be understood in conjunction with the description of Embodiment 1, and is not repeated here.

The following is a further description of the steps of the present invention.

Step 1: Establish a dataset for additive manufacturing, specifically by constructing a video dataset of the additive manufacturing process.

Figure 2:
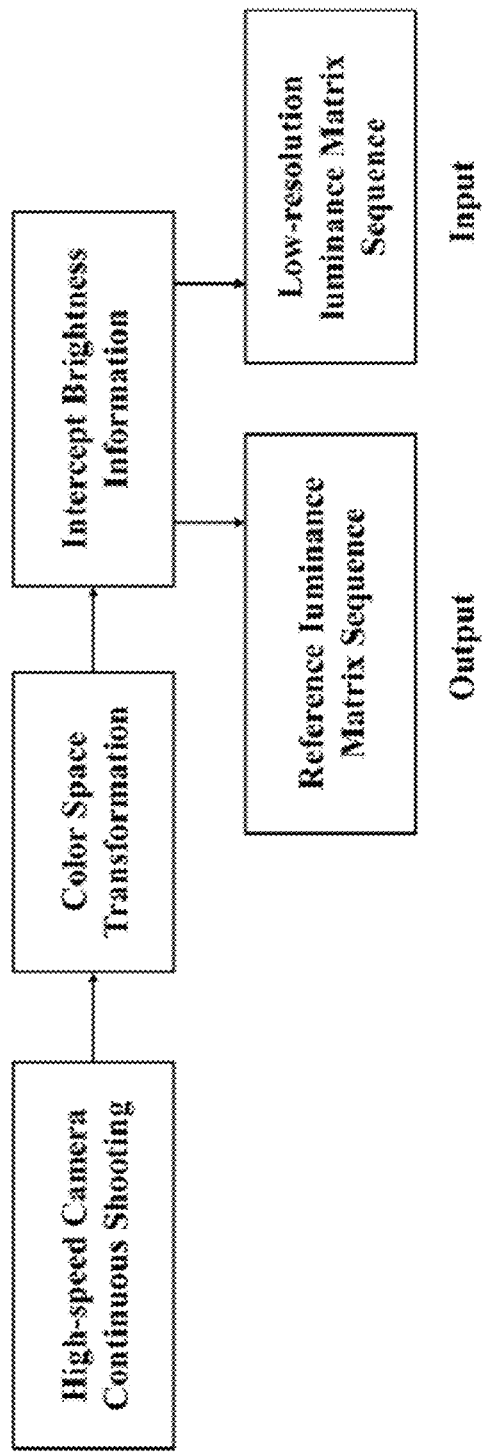
FIG. 2 illustrates a flowchart for establishing a video super-resolution dataset.

Referring to FIG. 2, a flowchart illustrating the process of establishing a video super-resolution dataset is presented. This process is crucial for preparing the input and output data pairs for training the video super-resolution model in the real-time monitoring system for additive manufacturing.

The process initiates with continuous shooting using a high-speed camera to capture the additive manufacturing process in real-time. The camera records M frames of the manufacturing process video. From these frames, 2N+1 consecutive frames are extracted, starting from the beginning with an interval of 1, resulting in the original image sequence $\{Im_{t-N}, \ldots, Im_t, \ldots, Im_{t+N}\}$ (N+1≤t≤M−N) in the RGB color space. Here, $Im_t$ represents the t-th original image in the sequence, with each element matrix having dimensions ($h_0$, $w_0$, 3), where $h_0$ and $w_0$ are the number of pixels in the height and width directions of the original image, respectively.

Subsequently, a color space conversion is carried out, transforming the RGB images into the YCbCr color space. This transformation enables the separation of luminance (brightness) information from chrominance (color) details. The transformation results in a reference brightness matrix sequence $\{GT_{t-N}, \ldots, GT_t, \ldots, GT_{t+N}\}$ (N+1≤t≤M−N), where $GT_t$ is the t-th reference brightness matrix in the sequence. Each element matrix in this sequence has dimensions of ($h_0$, $w_0$, 1), containing only the luminance (Y) channel information.

To create the low-resolution input for the super-resolution model, the reference brightness matrix sequence is down-sampled using nearest neighbor interpolation (the resolution of the brightness matrix sequence is reduced). This process reduces the resolution to 1/r of the original, resulting in a low-resolution brightness matrix sequence $\{X_{t-N}, \ldots, X_t, \ldots, X_{t+N}\}$ (N+1≤t≤M−N). Here, $X_t$ represents the t-th low-resolution brightness matrix, with each element matrix having dimensions of ($h_0/r$, $w_0/r$, 1).

The output of this process provides two key components for training the video super-resolution model:

(a). The low-resolution brightness matrix sequence $\{X_{t-N}, \ldots, X_t, \ldots, X_{t+N}\}$ serves as the input.

(b). The reference brightness matrix sequence $\{GT_{t-N}, \ldots, GT_t, \ldots, GT_{t+N}\}$ serves as the output or ground truth.

This data preparation phase is crucial for training the video super-resolution model, allowing it to accurately reconstruct high-resolution images from low-resolution inputs. This process is key to achieving high-quality real-time monitoring of the additive manufacturing process.

(1) Video super-resolution dataset.

Video shooting is conducted for the additive manufacturing process. Assuming that the manufacturing process video has M frames, starting from the beginning, the frame interval is 1 and 2N+1 frames are continuously captured, thus obtaining the original image sequence $\{Im_{t-N}, \ldots, Im_t, \ldots, Im_{t+N}\}$ (N+1≤t≤M−N) in the RGB color space. $Im_t$ represents the t-th original image in the original image sequence, where each element matrix size is ($h_0$, $w_0$, 3), $h_0$ and $w_0$ are the number of pixels in the height and width directions of the original image. Secondly, the reference brightness matrix sequence $\{GT_{t-N}, \ldots, GT_t, \ldots, GT_{t+N}\}$ (N+1≤t≤M−N) is obtained through RGB-YCbCr color space conversion, where $GT_t$ is the t-th reference brightness matrix in the reference brightness matrix sequence, and each element matrix has a size of ($h_0$, $w_0$, 1). The nearest neighbor interpolation method is used to reduce the resolution of the reference brightness matrix sequence to 1/r of the original, resulting in a low-resolution brightness matrix sequence $\{X_{t-N}, \ldots, X_t, \ldots, X_{t+N}\}$ (N+1≤t≤M−N). $X_t$ is the t-th low-resolution brightness matrix in the low-resolution brightness matrix sequence, where each element matrix has a size of ($h_0/r$, $w_0/r$, 1).

Training the video super-resolution model using the video super-resolution dataset, with the low-resolution luminance matrix sequence $\{X_{t-N}, \ldots, X_t, \ldots, X_{t+N}\}$ as input and the t-th reference luminance matrix $GT_t$ in the reference luminance matrix sequence as output.

In step 1, super-resolution reconstruction is performed on the middle frame of a continuous 2N+1 frame video sequence, which is the N+1 frame in the video sequence.

The matrix transformation method described in step 1 is to convert the RGB color space to the YCbCr color space, with the conversion formula being:

$$\begin{bmatrix} Y \\ Cb \\ Cr \end{bmatrix} = \begin{bmatrix} 0.299 & 0.587 & 0.114 \\ -0.169 & -0.331 & 0.500 \\ 0.500 & -0.419 & -0.081 \end{bmatrix} \cdot \begin{bmatrix} R \\ G \\ B \end{bmatrix} + \begin{bmatrix} 0 \\ 128 \\ 128 \end{bmatrix}, \begin{matrix} Y \in [0,255] \\ Cb \in [0,255] \\ Cr \in [0,255] \end{matrix}$$

Here, R, G, and B represent the component matrices of the image in the R, G, and B color channels, respectively. Meanwhile, Y, Cb, and Cr represent the component matrices of the converted image in terms of brightness, blue concentration offset, and red concentration offset.

(2) Feature segmentation dataset.

Save the additive manufacturing video captured by the aforementioned high-speed camera frame by frame, and manually label different feature contours during the manufacturing process, such as melt pools.

Train the feature segmentation model using the feature segmentation dataset, with the reference brightness matrix $GT_t$ as input and the corresponding manually annotated results as output.

Step 2: Build an real-time monitoring model for additive manufacturing.

The real-time monitoring model for additive manufacturing includes an attention based video super-resolution model and a feature segmentation model based on DeepLab network. The video super-resolution model takes the video sequence captured by a high-speed camera as input, and the feature segmentation model takes the output of the video super-resolution model as input. The entire model ultimately outputs a high-resolution feature segmentation map.

(1) Video super-resolution model ViTSR based on attention mechanism.

Build a spatiotemporal encoder to concatenate the encoding of the input sequence $\{X_{t-N}, \ldots, X_t, \ldots, X_t+N\}$ on its last dimension at both temporal and spatial scales. The Temporal Encoder (TE) of any frame $X_i$ ($-N \leq i \leq N$) in the input sequence represents its relative position in the sequence, with a matrix size of ($h_0/r$, $w_0/r$, 1), and each position is filled with $$\sin\left(\frac{i}{2N+1}\pi\right).$$

The spatial encoder (SE) of any frame in the input sequence represents the position of any pixel point in the frame, consisting of horizontal encoding $SE_x$ and vertical encoding $SE_y$, both of which have dimensions ($h_0$, $w_0$, 1). Let (m, n) be the position coordinates of a pixel in any frame $X_i$, with $1 \leq m \leq w_0$ and $1 \leq n \leq h_0$. Then its corresponding spatial encoding value is as follows:

$$SE_x(m, n) = \sin(m\pi/w_0 - \pi/2)$$
$$SE_y(m, n) = \sin(m\pi/h_0 - \pi/2)$$

Therefore, the matrix shape of any element in the concatenated spatiotemporal encoding of the input sequence $\{X_{t-N}, \ldots, X_t, \ldots, X_{t+N}\}$ is ($h_0$, $w_0$, 4).

Define a residual feature extraction module. This module consists of n cascaded residual blocks, each of which uniformly contains a 3D convolutional layer with a kernel size of 1×1, a batch normalization layer, a 3D convolutional layer with a kernel size of 3×3, and a batch normalization layer. The two 3D convolutional layers within each residual block have a kernel size of 32*index according to their index (1≤index≤n) and 32, the input of each residual block is a concatenation of the feature maps output by all previous residual blocks.

Define a query matrix generation module Gen_Q, which consists of k cascaded blocks. The structure of the first k−1 block includes 32n 3D convolutional layers and batch normalization layers with 1×1 convolution kernels, and the structure of the last block is 1 convolutional kernel a 3×3 3D convolutional layer and batch normalization layer.

Define a key matrix generation module Gen_K, which consists of k cascaded blocks. The structure of the first k−1 block includes 32n 3D convolution layers and batch normalization layers with 1×1 convolution kernels, and the structure of the last block is 2N convolution kernels a 3×3 3D convolutional layer and batch normalization layer.

Define a value matrix generation module Gen_V, which consists of k cascaded blocks. The structure of the first k−1 block includes 32n 3D convolutional layers and batch normalization layers with 1×1 convolution kernels, and the structure of the last block is 2N+1 convolution kernels a 3×3 3D convolutional layer and batch normalization layer.

Based on the above description, it can be seen that the structures of the three matrix generation modules are completely identical, but the weights are different after training. In the subsequent steps, these three modules can be used to obtain matrices with the same shape but different values.

Build a super-resolution model, with the network input being the input part $\{X_{t-N}, \ldots, X_t, \ldots, X_{t+N}\}$ from the dataset in step 1, The dimensions are all ($h_0/r$, $w_0/r$, 1). after being encoded by the spatiotemporal encoder TSE, the feature map matrix FM is obtained by inputting it into the residual feature extraction module. The FM is then input into the Gen_Q, Gen_K, and Gen_V modules (corresponding to the content in the dashed box of "Visual Transformer" in FIG. 4) to obtain the query matrix $Q_t$, key matrix $\{K_i\}$ (t−N≤i≤t+N, i≠t), and value matrix $\{V_i\}$ (t−N≤i≤t+N) of $X_t$. Using the query matrix $Q_t$ and key matrix $\{K_i\}$ to obtain the attention matrix, multiply it with the value matrix $\{V_i\}$, and then add it to the value matrix $V_t$ of the current frame to obtain the total feature map $FM_t$. The specific calculation is as follows:

$$FM_t = V_t + \sum_{i=t-1, i \neq t}^{t+1} \text{Softmax}(Q_t, K_i) V_i$$

The overall feature map $FM_t$ undergoes pixel rearrangement to obtain a super-resolution reconstruction result with a pixel resolution of ($h_0$, $w_0$, 1).

(2) Feature segmentation model FCN.

The feature segmentation model includes an encoder and a decoder. The encoder uses an open-source Xception network as the backbone to extract features, and outputs the feature extraction results and the feature extraction results after spatial pyramid pooling to the decoder, respectively. The decoder uses 1×1 convolution and 4-fold upsampling to fuse the two results to obtain the final high-resolution segmentation result.

Step 3: Train an real-time monitoring model using the dataset, that is, train a neural network model.

Specifically, the neural network model built in step 2 was trained using the dataset created in step 1. Mean square error was used as the loss function, and Adam optimizer was selected to optimize the network weights, resulting in the trained real-time monitoring model.

Step 4: Deploy the model to the edge computing device.

Deploy the trained real-time monitoring model on the edge computing device, and use the edge computing device to obtain real-time monitoring information of additive manufacturing.

Specifically, the real-time monitoring model trained in step 3 can be quantified and pruned using the edge computing hardware SDK to obtain the model adapted to the edge computing hardware. The model session can be created on the edge computing device and placed on the back end as a service. The relative position between the high-speed camera and the metal powder bed can be fixed, and the video stream captured by the high-speed camera can be connected to the back end interface, so as to obtain the real-time monitoring results of the additive manufacturing process.

The present invention will be illustrated with examples based on parameters.

Let N=1, M=1000, h₀=300, w₀=300, n=6, k=2, r=4, the convolution step size be 1, and the activation function be the relu function.

The process of the present invention mainly consists of four steps: data collection, model construction, model training, and model deployment. The integrated system is shown in FIG. 1. Firstly, a dataset is constructed by capturing images of the additive manufacturing process using a high-speed camera. Then, a network model is built and trained using the TensorFlow framework. Finally, the trained model is quantified, pruned, and deployed on an edge hardware detection system. When the real-time monitoring method is applied, a high-speed camera is used to take video shots of the additive manufacturing process. The edge computing equipment obtains three consecutive image sequences for super-resolution reconstruction of the current frame. Then, the feature extraction model is used to extract the plasma arc, molten pool and other features of the current frame, so as to achieve the purpose of real-time monitoring of the characteristics of the additive manufacturing process.

Step 1: Establish a dataset for additive manufacturing.

(1) Video super-resolution dataset.

Refer to FIG. 2, capture a video of the additive manufacturing process. The manufacturing process video consists of 1000 frames. Starting from scratch, three consecutive frames are captured with an interval of 1 to obtain the original image sequence $\{Im_t\}$ (1≤t≤1000) in the RGB color space. The reference brightness matrix sequence $\{GT_t\}$ (1≤t≤1000) of the additive manufacturing image is obtained by converting the RGB YCbCr color space. The formula is as follows:

$$\begin{bmatrix} Y \\ Cb \\ Cr \end{bmatrix} = \begin{bmatrix} 0.299 & 0.587 & 0.114 \\ -0.169 & -0.331 & 0.500 \\ 0.500 & -0.419 & -0.081 \end{bmatrix} \cdot \begin{bmatrix} R \\ G \\ B \end{bmatrix} + \begin{bmatrix} 0 \\ 128 \\ 128 \end{bmatrix}, \begin{array}{l} Y \in [0,255] \\ Cb \in [0,255] \\ Cr \in [0,255] \end{array}$$

Among them, R, G, and B represent the component matrices of the image to be converted on the R, G, and B color channels, respectively. Y, Cb, and Cr represent the component matrices of the converted image in terms of brightness, blue density offset, and red density offset. Only the data from channel Y is taken here, that is, only the brightness information of the image is retained to compress the data volume and reduce the computational load of subsequent neural networks. Therefore, the size of any matrix $GT_t$ in the brightness matrix sequence is (300, 300, 1).

Using the nearest neighbor interpolation method to reduce the resolution of the brightness matrix sequence $\{GT_t\}$ to ¼ of the original, we obtain a low-resolution brightness matrix sequence $\{X_t\}$ (1≤t≤1000).

Train the video super-resolution model using the video super-resolution dataset, with a low resolution brightness matrix sequence $\{X_t\}$ as input and a reference brightness matrix sequence $\{GT_t\}$ as output.

The matrix size of each element in the original image sequence $\{Im_t\}$ of the additive manufacturing process described in step 1 is (300, 300, 3). The size of each element matrix in the reference brightness matrix sequence $\{GT_t\}$ is (300, 300, 1). The size of each element matrix in the low resolution brightness matrix sequence $\{X_t\}$ is (75, 75, 1).

(2) Feature segmentation dataset.

Figure 3:
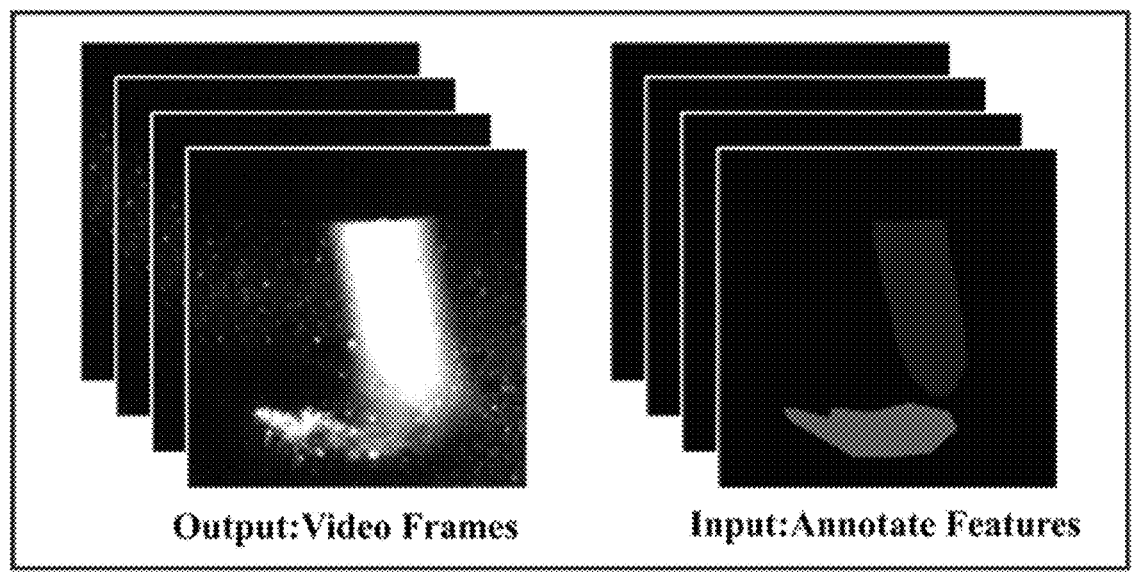
FIG. 3 illustrates a schematic diagram of establishing a feature segmentation dataset.

Referring to FIG. 3, the feature segmentation model is trained using the feature segmentation dataset, with video frames as input and corresponding manually annotated results as output.

Save the additive manufacturing video captured by the aforementioned high-speed camera frame by frame, and manually label different feature contours during the manufacturing process using the Labelme feature annotation tool, including melt pool and plasma arc.

Step 2: Build an real-time monitoring model for additive manufacturing.

(1) ViTSR, a video super-resolution model based on attention mechanism.

Figure 4:
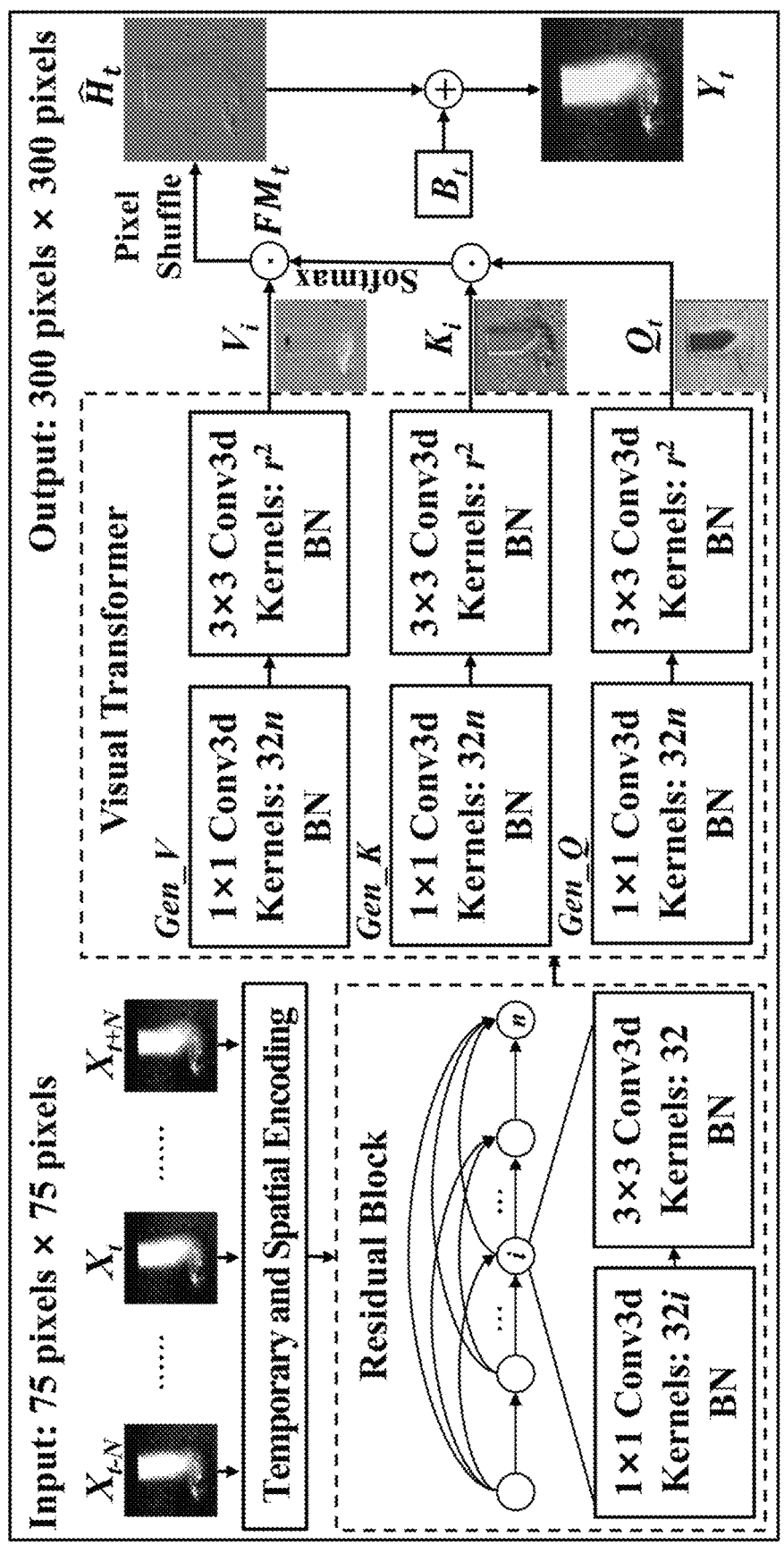
FIG. 4 illustrates the structure of the video super-resolution model.

The structure of Visual Transformer Super Resolution (ViTSR) network can be found in FIG. 4: Construct a spatiotemporal encoder to concatenate the encoding of the low resolution luminance matrix sequence $\{X_{t-N}, \ldots, X_t, \ldots, X_{t+N}\}$ in its last dimension on both temporal and spatial scales. The Temporal Encoder (TE) of any frame $X_i$ (−1≤i≤1) in the input sequence represents its relative position in the sequence, with a matrix size of (300, 300, 1). Each position is filled with sin (i/3π). The spatial encoder (SE) of any frame in the input sequence represents the position of any pixel point in the frame within the frame, consisting of horizontal encoding $SE_x$ and vertical encoding $SE_y$. The dimensions of $SE_x$ and $SE_y$ are both (300, 300, 1). Let (m, n) be the position coordinates of a pixel in any frame $X_i$, with 1≤m≤w₀ and 1≤n≤h₀. Then its corresponding spatial encoding value is as follows:

$$SE_x(m, n) = \sin(m\pi/w_0 - \pi/2)$$
$$SE_y(m, n) = \sin(m\pi/h_0 - \pi/2)$$

Define a residual feature extraction module, which consists of six cascaded residual blocks. Each residual block consists of a 3D convolutional layer with a convolution kernel size of 1×1, a batch normalization layer, a 3D convolutional layer with a convolution kernel size of 3×3, and a batch normalization layer. The two 3D convolutional layers within each residual block have convolution kernel numbers of 32*index and 32, respectively, according to their index (1≤index≤5). The input of each residual block is the concatenation of the feature maps output by all previous residual blocks.

Define a query matrix generation module Gen_Q, which consists of two cascaded blocks. The structure of the first block includes 160 3D convolutional layers with a kernel size of 1×1, a batch normalization layer, and the structure of the last block is a 3D convolutional layer with a kernel size of 3×3 and a batch normalization layer.

Define a key matrix generation module Gen_K, which consists of two cascaded blocks. The structure of the first block includes 160 3D convolutional layers and batch normalization layers with 1×1 convolution kernels. The structure of the last block consists of two 3D convolutional layers and batch normalization layers with 3×3 convolution kernels, where r is a multiple of the super-resolution reconstruction.

Define a value matrix generation module Gen_V, which consists of k cascaded blocks. The structure of the first block includes 160 3D convolutional layers and batch normalization layers with 1×1 convolution kernels. The structure of the last block consists of 3 3D convolutional layers and batch normalization layers with 3×3 convolution kernels, where r is a multiple of the super-resolution reconstruction.

That is, as shown in FIG. 4, a multi-branch neural network is constructed, with the network input being the input portion of the dataset in step 1, namely the low-resolution brightness matrix sequence $\{X_{t-1}, X_t, X_{t+1}\}$, each with a size of (75, 75, 1). $X_t$ is input into the residual feature extraction module and then into the Gen_Q, Gen_K, and Gen_V modules to obtain the query matrix $Q_t$, key matrix $\{K_{i-1}, K_{i+1}\}$, and value matrix $\{V_{i-1}, V_i, V_{i+1}\}$ of $X_t$, respectively. The attention matrix is obtained using the query matrix $Q_t$ and the key matrix $\{K_i\}$, and then multiplied by the value matrix $\{V_i\}$. The total feature map $FM_t$ is obtained by adding the attention matrix to the value matrix $V_t$ of the current frame. The specific calculation is as follows:

$$FM_t = V_t + \sum_{i=t-N, i \neq t}^{t+N} \text{Softmax}(Q_t, K_i) V_i$$

The overall feature map $FM_t$ undergoes pixel rearrangement to obtain the high-frequency feature map $\hat{H}_t$ of super-resolution reconstruction. $X_t$ is interpolated r-times bicubic to obtain the low-frequency feature map $B_t$. By adding $\hat{H}_t$ to $B_t$, obtaining the super-resolution reconstruction brightness matrix $Y_t$ with dimensions (300, 300, 1).

(2) Feature segmentation model FCN.

Figure 5:
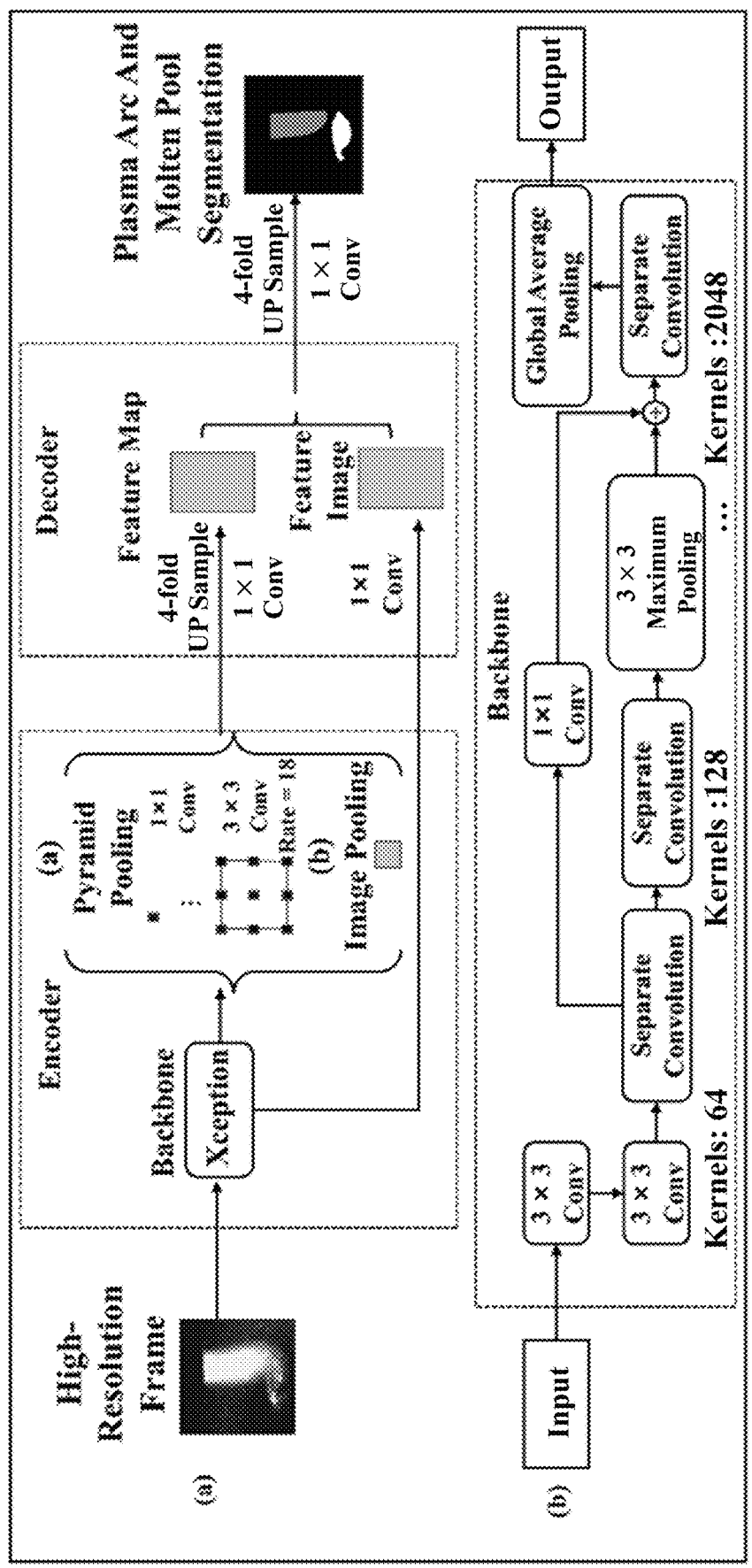
FIG. 5 illustrates a schematic diagram of the feature segmentation model.

In FIG. 5, the feature segmentation model includes an encoder and a decoder. The encoder uses an open-source Xception network as the backbone to extract features, and outputs the output feature extraction results and the feature extraction results after spatial pyramid pooling to the solution, respectively the encoder and decoder use 1×1 convolution and 4-fold upsampling to fuse the two results to obtain the final high-resolution segmentation result.

Specifically, as shown in (a) in FIG. 5, the feature segmentation model receives the high-resolution reconstruction luminance matrix $Y_t$ as input and extracts image features using the Xception network. Image features are computed in two ways, with one path directly output to the decoder. The other path passes through the spatial pyramid and image pooling to pool the image features and then outputs them to the decoder. The decoder uses 1×1 convolution to decode the image features, and uses 1×1 convolution and 4-fold upsampling to decode the pooled features. The two feature maps are merged and then used to obtain the final segmentation result using 1×1 convolution and 4-fold upsampling. (b) in FIG. 5 shows the detailed structure of the Xception backbone network.

Step 3: Train an real-time monitoring model using the dataset.

This step uses the dataset created in step 1 and the neural network built in step 2. The mean square error is used as the loss function, and the Adam optimizer is selected to optimize the network weights. Train 1000 iterations and retain the model with the smallest error.

Figure 6:
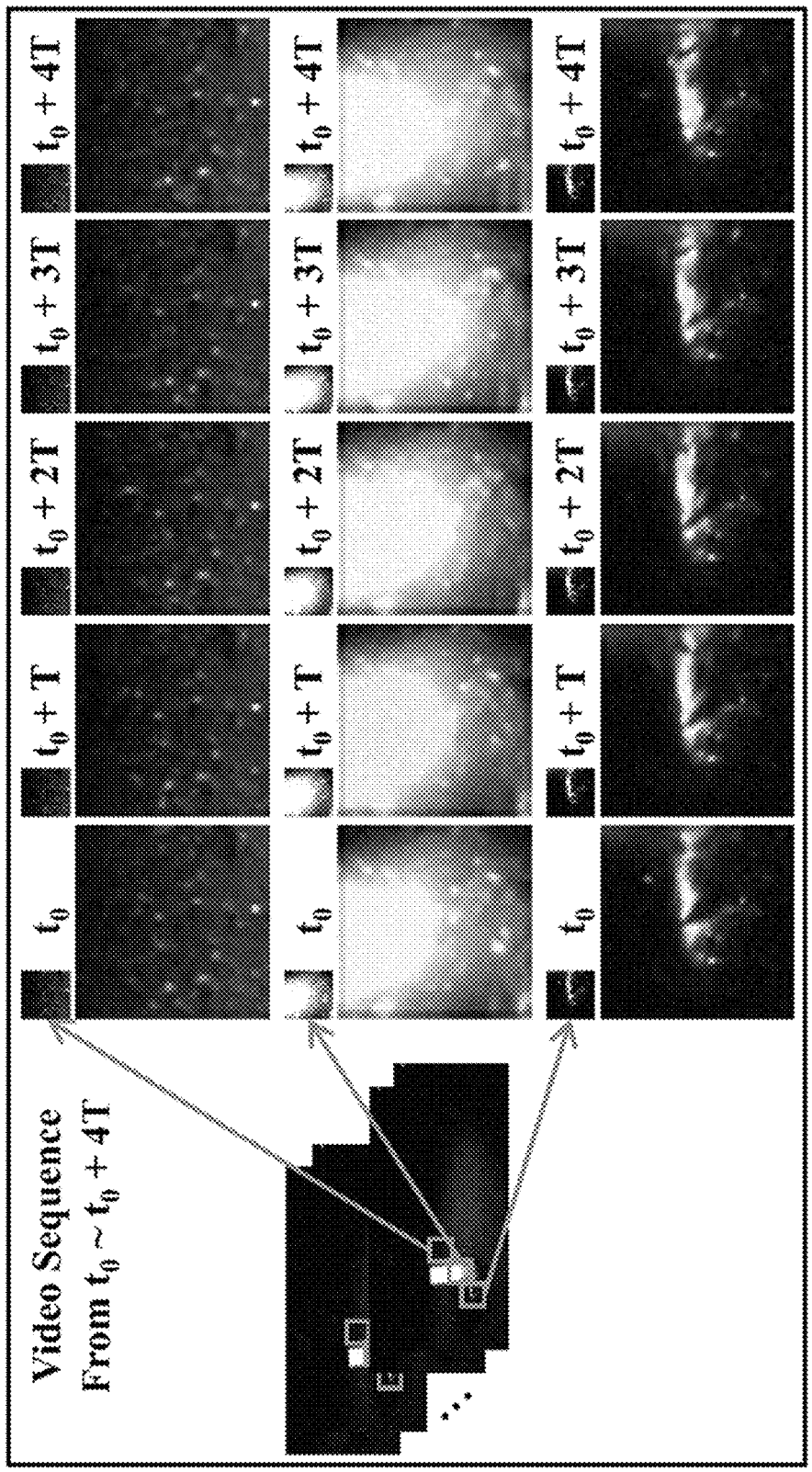
FIG. 6 illustrates the super-resolution effect image obtained based on a video sequence.

FIG. 6 shows the super-resolution effect obtained based on video sequences using a trained real-time monitoring model. Specifically, FIG. 6 shows the results of 4-fold super-resolution reconstruction of continuous additive manufacturing process images using the video super-resolution network proposed by the present invention (shooting rate: 30000 frames per second, T=1/30 millisecond). The image details are clear, the image is continuous, and there are no artifacts after super-resolution reconstruction.

In order to better verify the effectiveness of the present invention, the present invention will be compared with multiple existing conventional methods.

Figure 7:
FIG. 7 illustrates a comparison of the super-resolution results obtained by the present invention with other methods.

The existing super-resolution methods include Bicubic SRCNN, FSRCNN, ESPCN, DUF, TGA, referring to FIG. 7, the peak signal-to-noise ratio (PSNR) and structural similarity (SSIM) of the super-resolution reconstruction results obtained by this method (ViTSR) are superior to other super-resolution methods and interpolation methods.

Figure 8:
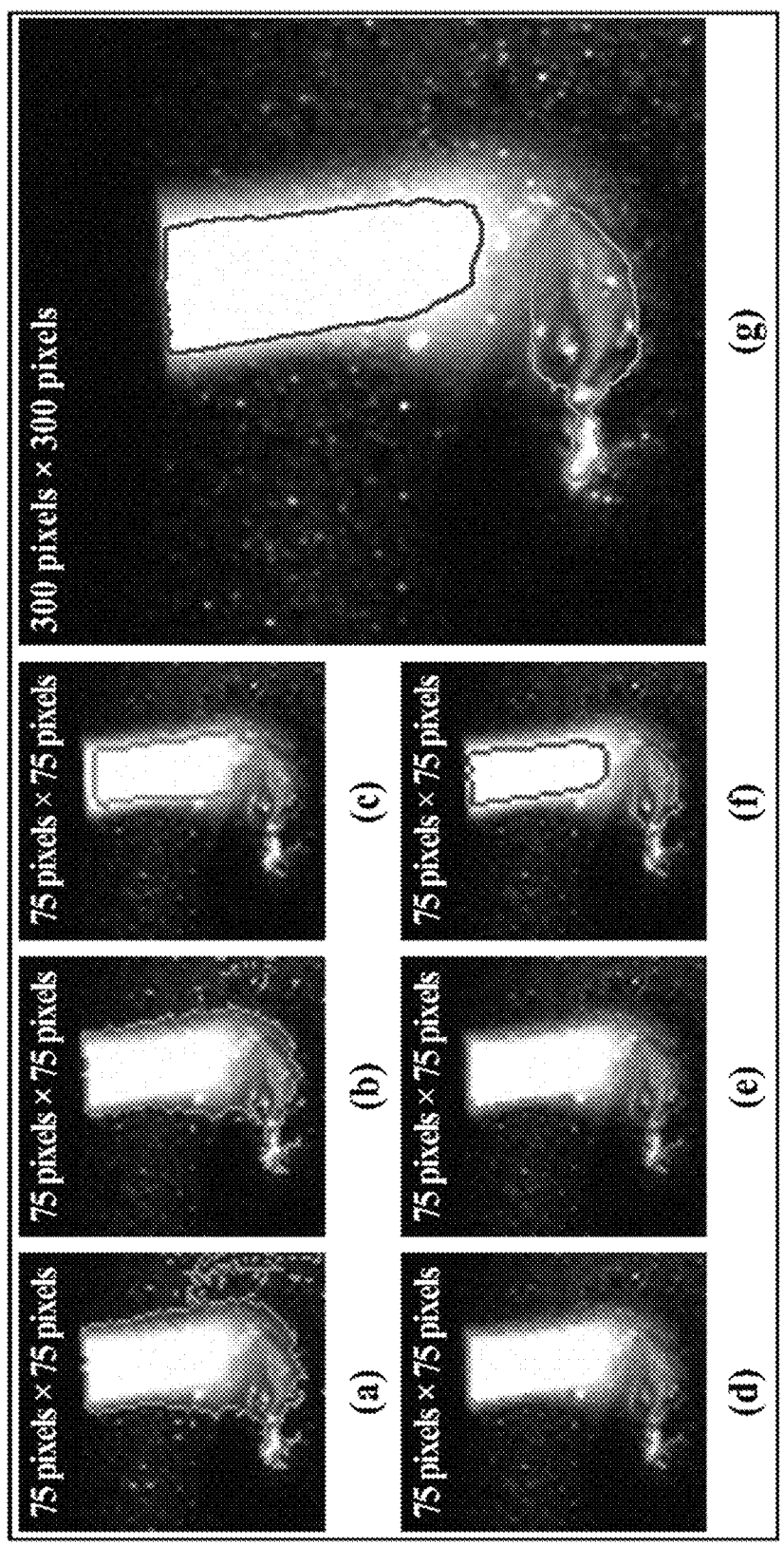
FIG. 8 illustrates a comparison of the feature segmentation results obtained by the present invention with methods.

The feature segmentation results obtained using commonly used feature extraction methods are shown in (a) to (f) of FIG. 8, where (a) in FIG. 8 corresponds to the triangle method, (b) in FIG. 8 corresponds to the maximum entropy method, (c) in FIG. 8 corresponds to the watershed method, (d) in FIG. 8 corresponds to the Otsu method, (e) in FIG. 8 corresponds to the basic global threshold method, and (f) in FIG. 8 corresponds to the fully convolutional network method. Under the condition of 75 pixels*75 pixels as input, the segmentation result obtained using the present invention is shown in (g) of FIG. 8. By comparison, it can be seen that the real-time monitoring model proposed by the present invention has higher resolution and accuracy in plasma arc and molten pool segmentation results under the same conditions compared to other methods.

Step 4: Deploy the model to the edge computing device.

Fix the relative position between the high-speed camera and the screening mechanism, quantify and prune the video super-resolution model ViTSR trained in step 3 to obtain a lightweight inference model ViTSR', and deploy it on a hardware computing platform in combination with the feature segmentation model FCN to determine in real-time whether there are any abnormalities in the printing process.

Figure 9:
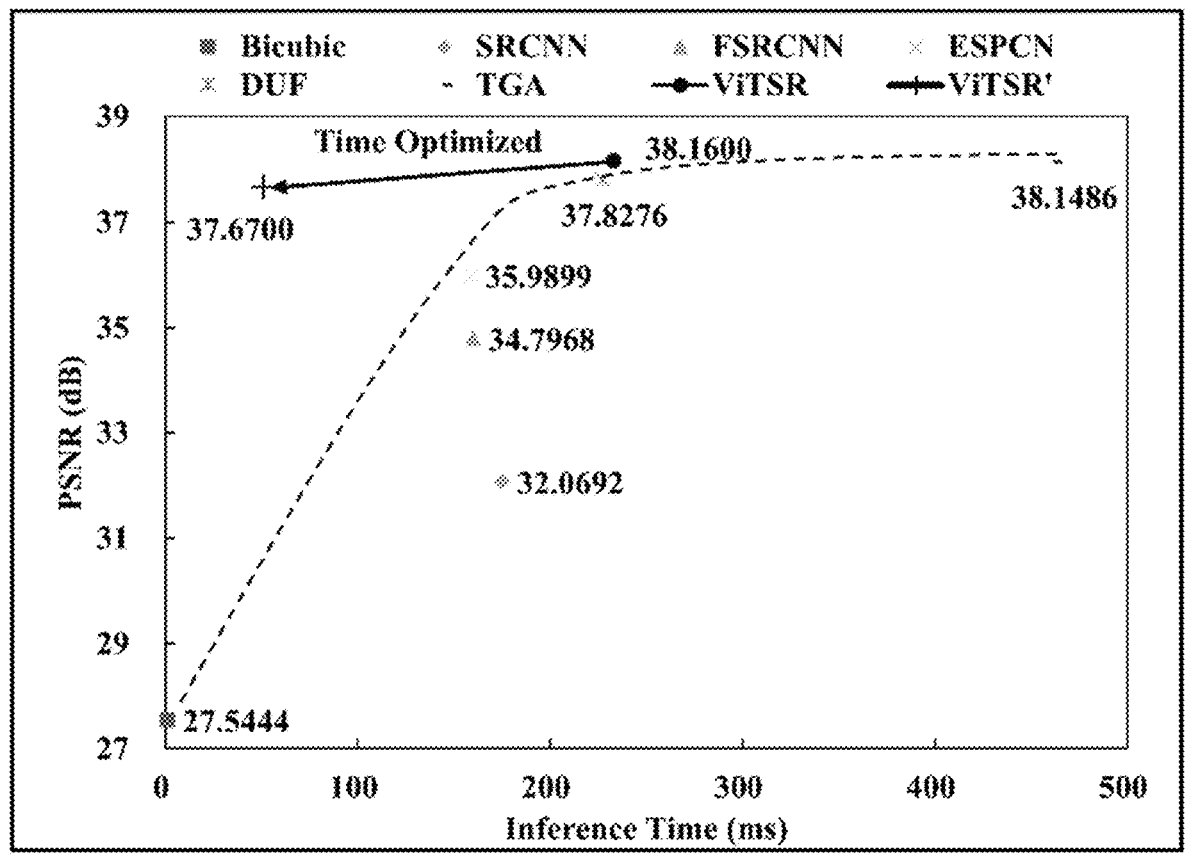
FIG. 9 illustrates the performance comparison of the present invention with other models in terms of peak signal-to-noise ratio and inference time.

FIG. 9 illustrates the average inference time and Peak Signal to Noise Ratio (PSNR) of our video super-resolution method in comparison with to other methods on the test set. It can be seen that the provided method demonstrates both short inference time and high picture quality as indicated by the PSNR value.

Figure 10:
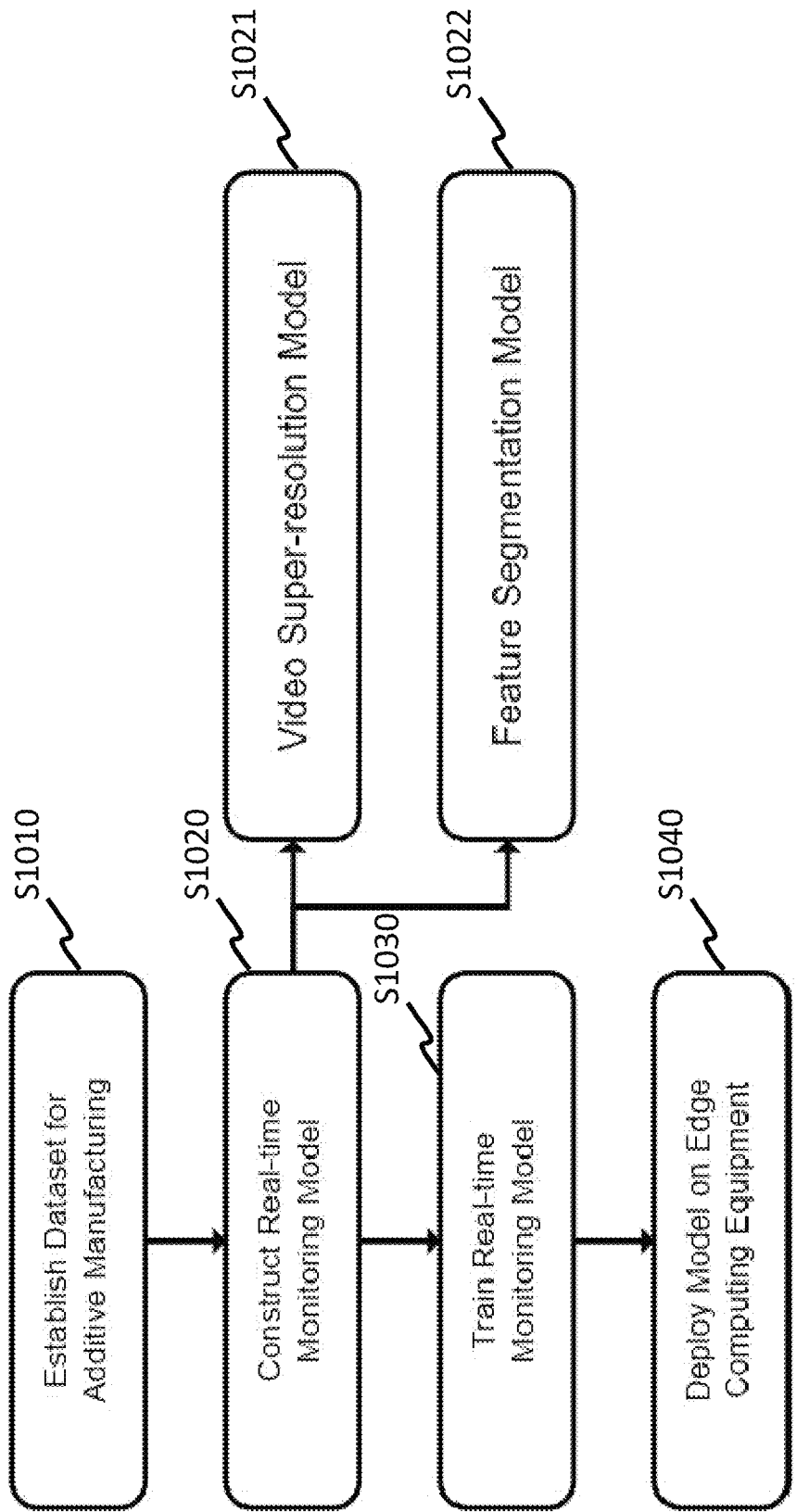
FIG. 10 illustrates a flowchart of edge computing-based real-time monitoring method for additive manufacturing according to an embodiment of the present invention.

FIG. 10 illustrates a flowchart of edge computing-based real-time monitoring method for additive manufacturing according to an embodiment of the present invention. As illustrated in FIG. 10, the edge computing-based real-time monitoring method for additive manufacturing proposed in this invention comprises four key steps:

1. Establish Dataset for Additive Manufacturing (S1010): This step involves capturing video sequences of the additive manufacturing process using a high-speed camera and performing necessary preprocessing, such as color space transformation and resolution adjustment.
2. Construct Real-time Monitoring Model (S1020): This model consists of two main components: (a) Video Super-resolution Model (S1021): Used to enhance the quality of low-resolution videos; (b) Feature Segmentation Model (S1022): Used to identify and segment key features in the additive manufacturing process.
3. Train Real-time Monitoring Model (S1030): The model is trained using the established dataset, optimizing model parameters to improve performance.
4. Deploy Model on Edge Computing Equipment (S1040): The trained model is deployed on edge computing equipment to achieve real-time monitoring of the additive manufacturing process.

This flowchart clearly demonstrates the main steps of the invention and their logical relationships, facilitating understanding of the working principles of the entire real-time monitoring system. Through this method, high-quality monitoring can be ensured while reducing data transmission volume, thereby improving the system's real-time performance and efficiency.

The Video Super-resolution Model includes a spatiotemporal encoder, a residual feature extraction module, and modules for generating query, key, and value matrices. It processes input video sequences with a pixel resolution of ($h_0$/r, $w_0$/r, 1), where $h_0$ and $w_0$ represent the number of pixels in the height and width directions of the image, respectively, and r is the magnification factor for super-resolution reconstruction. The model outputs a super-resolution reconstruction result with a pixel resolution of ($h_0$, $w_0$, 1).

The Feature Segmentation Model takes the output of the Video Super-resolution Model as input and produces feature segmentation maps, identifying critical features in the additive manufacturing process.

By deploying this trained real-time monitoring model on edge computing equipment, the system can obtain real-time monitoring information of the additive manufacturing process, enabling timely detection and response to potential issues.

Based on above, the present invention demonstrates significant practical applications in the field of additive manufacturing, addressing critical challenges in real-time monitoring and quality control. By leveraging edge computing and advanced AI algorithms, this system offers tangible benefits in industrial settings:

Enhanced Quality Control: The real-time monitoring capability allows for immediate detection of defects such as density differences, anisotropy, local deformations, and stress concentrations during the additive manufacturing process. This enables prompt corrective actions, significantly reducing waste and improving overall product quality.

Increased Production Efficiency: By processing data at the edge, the system minimizes communication latency and data transmission issues. This real-time feedback mechanism allows for rapid adjustments to manufacturing parameters, optimizing the production process and increasing overall efficiency.

Cost Reduction: The system's ability to use lower resolution cameras while achieving high-quality monitoring through super-resolution techniques results in substantial cost savings in equipment investments. Furthermore, the reduction in defective products leads to material savings and decreased production costs.

Improved Resource Utilization: The edge computing approach significantly reduces the bandwidth requirements for data transmission. The system allows for more efficient use of network resources, enabling monitoring in environments with limited connectivity.

Adaptability to Various Manufacturing Environments: The system's design, incorporating both video super-resolution and feature segmentation models, makes it adaptable to different additive manufacturing processes and materials. This versatility enhances its practical applicability across various industrial sectors, including aerospace, automotive, and biomedical engineering.

Facilitation of Industry 4.0 Integration: By providing high-resolution, low-latency monitoring capabilities, this invention aligns with and facilitates the implementation of Industry 4.0 principles in additive manufacturing.

Finally, it should be noted that the above specific embodiments are only used to illustrate the technical solution of the present invention and not to limit it. Although the present invention has been described in detail with reference to examples, those of ordinary skill in the art should understand that the technical solution of the present invention can be modified or equivalently replaced without departing from the spirit and scope of the technical solution of the present invention, which should be included in the scope of the claims of the present invention.

What is claimed is:

1. An edge computing-based real-time monitoring method for additive manufacturing, comprising: establishing a dataset for additive manufacturing, wherein the dataset comprises a video super-resolution dataset and feature segmentation dataset; constructing an real-time monitoring model for additive manufacturing, wherein the real-time monitoring model comprises a video super-resolution model and a feature segmentation model, wherein the video super-resolution model takes video sequences as input, the feature segmentation model takes the output of the video super-resolution model as input, and the feature segmentation model outputs feature segmentation maps, wherein the video super-resolution model comprises a spatiotemporal encoder, a residual feature extraction module, a query matrix generation module, a key matrix generation module, and a value matrix generation module, wherein pixel resolution of any frame image in the input video sequence is (h0/r, w0/r, 1), where h0 and w0 are number of pixels in the height and width directions of the image, respectively, and r is magnification factor of super-resolution reconstruction, the video sequence, after being encoded by the spatiotemporal encoder, is input to the residual feature extraction module to obtain a feature map matrix, the feature map matrix is then input to the query matrix generation module, the key matrix generation module, and the value matrix generation module to obtain a query matrix, a key matrix, and a value matrix, respectively, wherein, by the video super-resolution model, obtaining a total feature map based on the query matrix, the key matrix, and the value matrix, wherein, by the video super-resolution model, rearranging the total feature map by pixels to obtain a super-resolution reconstruction result with a pixel resolution of (h0, w0, 1); training the real-time monitoring model using the dataset and obtaining a trained real-time monitoring model; and deploying the trained real-time monitoring model on edge computing equipment, and use the edge computing equipment to obtain real-time monitoring information of additive manufacturing.

2. The edge computing-based real-time monitoring method for additive manufacturing according to claim 1, wherein the residual feature extraction module comprises n cascaded residual blocks, each residual block comprises a first 3D convolutional layer with a kernel size of 1×1, a first batch normalization layers, a second 3D convolutional layer with a kernel size of 3×3, and a second batch normalization layers, Wherein the number of convolution kernels in the first 3D convolutional layer is 32*index, wherein 1≤index≤n, the number of convolution kernels in the second 3D convolutional layer is 32.

3. The edge computing-based real-time monitoring method for additive manufacturing according to claim 1, wherein the query matrix generation module, the key matrix generation module, and the value matrix generation module have the same structure, and each comprises k cascaded blocks, wherein the structures of the first k-1 blocks each comprise a third 3D convolutional layer with a convolution kernel size of 1×1 and a third batch normalization layer, wherein the number of convolution kernels in the third 3D convolutional layer is 32n, where n is the number of residual blocks comprised in the residual feature extraction module, wherein the structure of the last block comprises a fourth 3D convolutional layer with a convolution kernel size of 3×3 and a fourth batch normalization layer, the number of convolution kernels in the fourth 3D convolutional layer is 1.

4. The edge computing-based real-time monitoring method for additive manufacturing according to claim 3, wherein the weights of the query matrix generation module, the key matrix generation module and the value matrix generation module after training is different, and the matrices with the same shape but different values are obtained by using the query matrix generation module, the key matrix generation module and the value matrix generation module.

5. The edge computing-based real-time monitoring method for additive manufacturing according to claim 1, wherein the input video sequence is denoted as $\{X_{t-N}, \ldots, X_t, \ldots, X_{t+N}\}$, the query matrix is denoted as Qt, the key matrix is denoted as $\{K_i\}$ (t−N≤i≤t+N, i≠t), the value matrix is denoted as $\{V_i\}$ (t−N≤i≤t+N), the value matrix of the current frame is denoted as Vt, and the calculation method for the total feature map is as follows:

$$FM_t = V_t + \sum_{i=t-N, i \neq t}^{t+N} \text{Softmax}(Q_t, K_i) V_i$$

wherein $FM_t$ is the total feature map.

6. The edge computing-based real-time monitoring method for additive manufacturing according to claim 1, wherein the feature segmentation model comprises an encoder and a decoder, wherein the encoder uses an Xception network as a backbone to extract features, the encoder outputs the feature extraction results output by the video super-resolution model and the feature extraction results after spatial pyramid pooling to the decoder respectively, wherein the decoder uses 1×1 convolution and 4-fold upsampling to fuse the two feature extraction results and output a high-resolution feature segmentation map.

7. The method according to claim 1, the method further comprises: using a high-speed camera to capture a process of additive manufacturing and obtain an original image sequence in a RGB color space; obtaining a reference brightness matrix sequence through RGB YCbCr color space conversion; using nearest neighbor interpolation to reduce a resolution of the reference brightness matrix sequence to 1/r of its original value, resulting in a low resolution brightness matrix sequence; training the video super-resolution model using the video super-resolution dataset, with the low resolution brightness matrix sequence as input and the reference brightness matrix sequence as output; training the feature segmentation model using the feature segmentation dataset, with the reference brightness matrix as input and feature segmentation maps annotated with different feature contours in the additive manufacturing process as output.

8. The edge computing-based real-time monitoring method for additive manufacturing according to claim 1, wherein when training the real-time monitoring model, a mean square error is used as a loss function, and an Adam optimizer is selected to optimize the network weight.

9. The edge computing-based real-time monitoring method for additive manufacturing according to claim 1, wherein the method further comprising:
quantizing and pruning the trained real-time monitoring model by edge computing hardware SDK to obtain a model adapted to hardware of the edge computing device; creating a model session in the edge computing device and place placing the model session on a back end as a service; fixing a relative position between a high-speed camera and a metal powder bed; connecting a video sequence captured by the high-speed camera to a back end interface; and using the edge computing device to obtain real-time monitoring information of additive manufacturing.

10. An edge computing-based real-time monitoring system for additive manufacturing, comprising:
an edge computing device and a high-speed camera;
the high-speed camera is used to photograph the additive manufacturing process and transmit the captured video sequence to the edge computing device; the edge computing device is deployed with the trained real-time monitoring model, and the edge computing device is used to obtain real-time monitoring information of additive manufacturing;
the edge computing-based real-time monitoring system for additive manufacturing is used to execute the steps in the edge computing-based real-time monitoring method for additive manufacturing according to claim 1.

* * * * *